United States Patent
Barkan et al.

(10) Patent No.: US 8,670,335 B2
(45) Date of Patent: Mar. 11, 2014

(54) REDUCED POWER TRANSMISSION

(75) Inventors: Ozdal Barkan, Mountain View, CA (US); Tak-Lap Tsui, Sunnyvale, CA (US)

(73) Assignee: Marvell World Trade Ltd., St. Michael (BB)

(*) Notice: Subject to any disclaimer, the term of this patent is extended or adjusted under 35 U.S.C. 154(b) by 535 days.

(21) Appl. No.: 12/415,705

(22) Filed: Mar. 31, 2009

(65) Prior Publication Data

US 2009/0252054 A1    Oct. 8, 2009

Related U.S. Application Data (60) Provisional application No. 61/041,744, filed on Apr. 2, 2008.

(51) Int. Cl.
| | |
|---|---|
| H04L 12/28 | (2006.01) |
| H04L 12/26 | (2006.01) |
| G06F 15/16 | (2006.01) |
| G06F 1/00 | (2006.01) |
| G01R 31/11 | (2006.01) |
| H03L 5/02 | (2006.01) |

(52) U.S. Cl.
USPC ............ 370/252; 370/242; 370/255; 709/237; 713/300; 324/534; 327/306

(58) Field of Classification Search
USPC .................... 370/245, 253; 713/321; 709/233
See application file for complete search history.

(56) References Cited

U.S. PATENT DOCUMENTS

| | | | |
|---|---|---|---|
| 5,784,559 A | 7/1998 | Frazier | |
| 6,076,062 A | 6/2000 | Van Steenbrugge | |
| 6,128,666 A | 10/2000 | Muller et al. | |
| 6,233,243 B1 | 5/2001 | Ganmukhi et al. | |
| 6,529,957 B1 * | 3/2003 | Joergensen | 709/233 |
| 6,542,581 B2 * | 4/2003 | Suonsivu et al. | 379/1.04 |
| 6,791,942 B2 * | 9/2004 | Jin | 370/229 |
| 6,920,132 B1 | 7/2005 | Lo | |
| 6,975,637 B1 | 12/2005 | Lenell | |
| 7,058,823 B2 * | 6/2006 | Lapidus | 713/300 |
| 7,127,521 B2 * | 10/2006 | Hsu et al. | 709/233 |
| 7,379,422 B2 | 5/2008 | Nation | |
| 7,450,509 B2 | 11/2008 | Hao | |
| 7,519,370 B2 | 4/2009 | Febvre et al. | |
| 7,558,874 B1 * | 7/2009 | Kodukula et al. | 709/237 |
| 7,664,972 B2 * | 2/2010 | Diab et al. | 713/300 |

(Continued)

FOREIGN PATENT DOCUMENTS

| | | |
|---|---|---|
| EP | 1246398 | 10/2002 |
| WO | WO-2006052360 | 5/2006 |

OTHER PUBLICATIONS

"U.S. Appl. No. 61/041,744", (Apr. 2, 2008).
"PCT Search Report", Applicatiion No. PCT/US2009/038989.

(Continued)

Primary Examiner — Habte Mered (57) ABSTRACT

Reduced power transmission is described. In embodiments, networked devices communicate via a network connection. A characteristic of the network connection between the networked devices can be determined, and an output amplitude of a signal that is indicative of the communications between the network devices can be adjusted based on the characteristic of the network connection. Power consumption that is utilized for the communications between the network devices is reduced based on the adjustment of the output amplitude of the signal.

15 Claims, 4 Drawing Sheets

(56) References Cited

U.S. PATENT DOCUMENTS

| | | | |
|---|---|---|---|
| 7,760,723 | B1 | 7/2010 | Daines et al. |
| RE41,494 | E | 8/2010 | Ahern et al. |
| 7,826,360 | B1 | 11/2010 | Hutchison |
| 7,839,152 | B2* | 11/2010 | Lee et al. .................. 324/614 |
| 7,885,546 | B2 | 2/2011 | Liu et al. |
| 8,009,574 | B2* | 8/2011 | Schenk .................. 370/252 |
| 2006/0023735 | A1* | 2/2006 | Sasson .................. 370/445 |
| 2006/0063498 | A1* | 3/2006 | Chan .................. 455/127.2 |
| 2006/0268733 | A1 | 11/2006 | Rhee et al. |
| 2007/0248118 | A1 | 10/2007 | Bishara et al. |
| 2008/0089433 | A1* | 4/2008 | Cho et al. .................. 375/267 |
| 2008/0123555 | A1 | 5/2008 | Qi et al. |
| 2008/0129118 | A1* | 6/2008 | Diab .................. 307/35 |
| 2008/0148081 | A1* | 6/2008 | Diab et al. .................. 713/320 |
| 2008/0172564 | A1* | 7/2008 | Diab et al. .................. 713/300 |
| 2008/0192631 | A1 | 8/2008 | Ardhanari et al. |
| 2008/0212485 | A1* | 9/2008 | Schenk .................. 370/252 |
| 2008/0219289 | A1* | 9/2008 | Harrison et al. .................. 370/465 |
| 2008/0225881 | A1* | 9/2008 | Powell .................. 370/463 |
| 2008/0310304 | A1* | 12/2008 | Edwards et al. .................. 370/234 |
| 2009/0154465 | A1* | 6/2009 | Diab et al. .................. 370/395.1 |
| 2009/0210725 | A1* | 8/2009 | Kim et al. .................. 713/300 |
| 2009/0252054 | A1* | 10/2009 | Barkan et al. .................. 370/252 |
| 2010/0077239 | A1* | 3/2010 | Diab et al. .................. 713/310 |
| 2010/0262850 | A1* | 10/2010 | Lin et al. .................. 713/320 |
| 2011/0051620 | A1* | 3/2011 | Taich et al. .................. 370/252 |

OTHER PUBLICATIONS

"Part 3: Carrier Sense Multiple Access with Collision Detection (CSMA/CD) Access Method and Physical Layer Specifications", *IEEE Standards*, (Mar. 8, 2002), 10 pages.

"Amendment: Physical Layer and Management Parameters for 10 GB/s Operation—Type 10GBASE-T", *LAN MAN Standards Committee of the IEEE Computer Society*, (2004), 145 pages.

"Non-Final Office Action", U.S. Appl. No. 12/193,519, (Mar. 29, 2010), 21 pages.

"Notice of Allowance", U.S. Appl. No. 12/193,519, (Jun. 22, 2010), 6 pages.

"Final Office Action", U.S. Appl. No. 13/014,611, Jun. 17, 2013, 16 pages.

"Non-Final Office Action", U.S. Appl. No. 13/014,611, Dec. 28, 2012, 8 pages.

"Non-Final Office Action", U.S. Appl. No. 13/014,611, filed Dec. 20, 2013, 16 pages.

* cited by examiner

REDUCED POWER TRANSMISSION

RELATED APPLICATIONS

This application claims priority to U.S. Provisional Patent Application Ser. No. 61/041,744 filed Apr. 2, 2008 entitled "Green Ethernet", the disclosure of which is incorporated by reference herein in its entirety.

BACKGROUND

A communication network can be implemented as a wired or wireless communication network of various fixed and/or mobile devices that are commonly referred to as nodes, client devices, or peer devices of the network. An Ethernet is a commonly implemented local area network (LAN) and is specified in IEEE standard 802.3. Ethernet systems are identified as 10 Base-T, 100 Base-T (Fast Ethernet), and 1000 Base-T (Gigabit Ethernet) having respective transmission speeds of 10 Mbit/s, 100 Mbit/s, and 1000 Mbit/s. A 10-Gigabit Ethernet is also specified in the IEEE 802.3an supplement to the IEEE standard 802.3. Green Ethernet is a recent term used to describe Energy Efficient Ethernet, and an Ethernet system that implements energy saving modes.

SUMMARY

This summary introduces concepts of reduced power transmission, and the concepts are further described below in the Detailed Description. Accordingly, the summary should not be considered to identify essential features nor used to limit the scope of the claimed subject matter.

In embodiments of reduced power transmission, a network device includes a network interface for communications with a connected device via a network connection. The network device also includes a cable tester to determine a characteristic of the network connection from the network interface to the connected device. The network device also includes an amplitude controller to adjust an output amplitude of a signal that is indicative of the communications based on the characteristic of the network connection.

In other embodiments, a network system includes a network connection for communications between networked devices. The network system also includes a network device to determine a characteristic of the network connection and reduce an output amplitude of a signal that is indicative of the communications based on the characteristic of the network connection.

In other embodiments, a method is implemented in a network device for communicating with a connected device via a network connection. The method is also implemented for determining a characteristic of the network connection, and adjusting an output amplitude of a communication signal based on the characteristic of the network connection.

BRIEF DESCRIPTION OF THE DRAWINGS

Embodiments of reduced power transmission are described with reference to the following drawings. The same numbers are used throughout the drawings to reference like features and components.

DETAILED DESCRIPTION

A network interface includes a physical layer that consumes power to communicate or transmit data between network devices, such as from a network switch to a network device via a network connection. In an example, the network switch can communicate with the network device via an Ethernet connection. The IEEE standard 802.3 that pertains to Ethernet specifies an output amplitude of two volts peak-to-peak for a one-hundred meter Ethernet connection. However, the standard is based on a test circuit rather than an actual connected cable, and an output amplitude of approximately one volt (e.g., half of the standard) will support approximately an eighty meter Ethernet connection. In many applications, such as in an office environment, Ethernet connections are shorter than one-hundred meters. An output amplitude of a signal that is indicative of the communications between the network devices can be reduced and power is conserved that would otherwise be used to transmit or communicate the data.

Embodiments of reduced power transmission provide various techniques to reduce power consumption and conserve energy for network systems and networked devices that implement energy saving modes and techniques. While features and concepts of the described systems and methods for reduced power transmission can be implemented in any number of different environments, systems, networks, and/or various configurations, embodiments of reduced power transmission are described in the context of the following exemplary environments.

Figure 1:
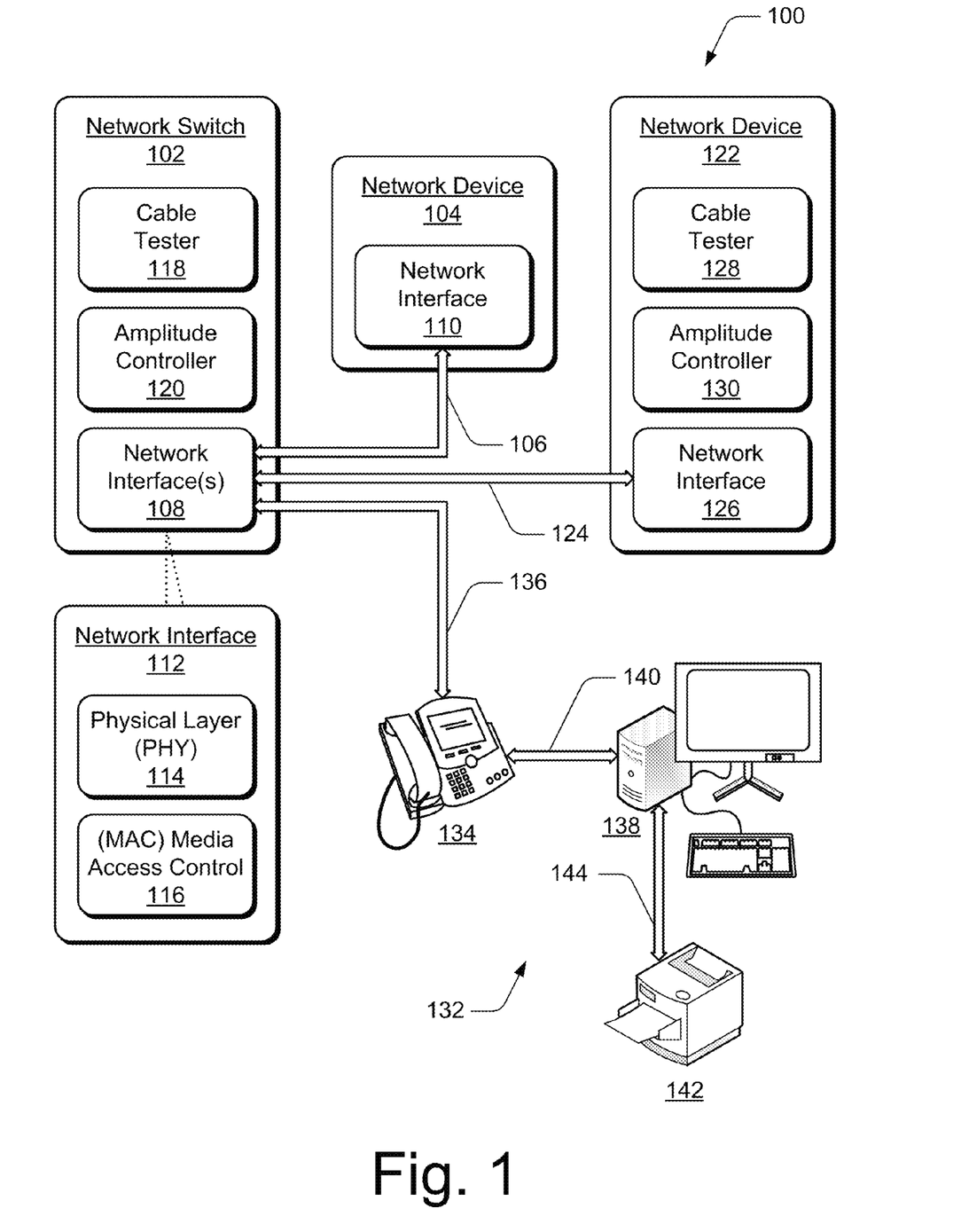
FIG. 1 illustrates an exemplary Ethernet system in which embodiments of reduced power transmission can be implemented.

FIG. 1 illustrates an exemplary network system 100 in which embodiments of reduced power transmission can be implemented. The exemplary network system is representative of a network configuration that may be implemented in a home or business, and generically represents connecting several network devices. In an embodiment, the exemplary network system 100 is an Ethernet system that connects proximate network devices. The network devices can be connected in an Ethernet system with various types of wire and/or cable connections, such as coaxial copper cable, a twisted pair cable, and/or fiber optic cabling. Exemplary system 100 includes a network switch 102 and a network device 104 connected via a network connection 106 for communication of data (e.g., data packets and/or data frames) according to a network communication protocol. The network device 104 can be implemented as any one or combination of a network node device, client device, peer device, media device, computer device, gaming device, appliance device, electronic device, IP phone for VoIP communications, and/or as any other type of device that includes Ethernet system functionality.

The network switch 102, network device 104, and any of the other network devices in the exemplary network system 100 are implemented to include various components to enable data communication via a local area network (LAN). The various switches and devices can also include one or more processors (e.g., any of microprocessors, controllers, and the like), communication components, data inputs, memory components, processing and control circuits, and/or any combination of the differing components as described with reference to the exemplary device shown in FIG. 4.

In this example, the network switch 102 includes network interfaces 108, and network device 104 includes a network interface 110. An exemplary network interface 112 is representative of the network interfaces that are implemented in the various switches and devices to implement the network system 100. The exemplary network interface 112 includes a physical layer (PHY) 114 and a media access controller (MAC) 116, and can be implemented as a network interface card that connects into a network switch or device. The physical layer 114 includes the electrical and/or mechanical system interface to the physical medium (i.e., network connection 106, or an Ethernet connection). For example, the physical layer can be implemented for 100 Base-T (Fast Ethernet) data frame communication at 100 Mbit/s, or implemented for 1000 Base-T (Gigabit Ethernet) data frame communication at 1000 Mbit/s. The media access controller 116 implements data link control and a unique MAC address for a particular device in the network system 100, as well as controls data transmission, reception, parsing, and error detection.

In this example, the network switch 102 also includes a cable tester 118 (also referred to as a virtual cable tester) and an amplitude controller 120 that can each be implemented as computer-executable instructions maintained by a memory and executed by a processor to implement embodiments of reduced power transmission. Alternatively or in addition, the cable tester 118 and/or the amplitude controller 120 can each be implemented as hardware, software, firmware, or any combination thereof. Although the cable tester 118 and the amplitude controller 120 are described as independent modules or components of the network switch 102, the network interface 108 can be implemented to integrate a physical layer (PHY) 114, a media access controller (MAC) 116, the cable tester 118, and/or the amplitude controller 120.

In various embodiments, the cable tester 118 is implemented to determine a characteristic of a network connection between networked devices, such as the length, signal-to-noise ratio (SNR), and/or gain of network connection 106 from the network interface 108 at network switch 102 to the network interface 110 at network device 104. The cable tester 118 can be implemented to determine the length of a network connection by utilizing a technique for time domain reflectometry (TDR) to measure the delay of a test signal. Alternatively or in addition, the cable tester 118 can utilize a signal-to-noise ratio (SNR) and/or gain status as determined by a digital signal processing (DSP) engine when included in network switch 102. The signal-to-noise ratio (SNR) and/or gain status can also be utilized as indirect indications of network connection length (i.e., a lower SNR or less gain indicates a longer network connection).

In various embodiments, the amplitude controller 120 is implemented to adjust an output amplitude of a signal that is indicative of the communications to the network device 104 via the network connection 106 based on the one or more characteristics of the network connection. The amplitude controller 120 can be implemented to adjust the output amplitude of the signal for the communications by reducing the current output at a current-mode driver or current controller of the physical layer 114, or by reducing the voltage at a voltage-mode driver or voltage controller at the physical layer 114. The physical layer 114 of the network interface 108 consumes power to transmit data for the communications in accordance with a standard for the network connection. For example, the IEEE standard 802.3 that pertains to Ethernet specifies an output amplitude of two volts peak-to-peak for a one-hundred meter Ethernet connection. However, the standard is based on a test circuit rather than an actual connected cable, and an output amplitude of approximately one volt (e.g., half of the standard) will support approximately an eighty meter Ethernet connection.

In an embodiment, the cable tester 118 can determine that the length of the network connection 106 is less than the Ethernet standard of one-hundred meters (e.g., equal to or less than a preset length, such as eighty meters), and the amplitude controller 120 can initiate that the output amplitude of the signal for the communications be adjusted or reduced. The physical layer of the network interface 108 can then reduce power consumption to transmit the data for the communications at the reduced output amplitude. In the example of communications from the network switch 102 to the network device 104, the implementation of reduced power transmission is transparent to network device 104.

In another embodiment, the network switch 102 is connected to a network device 122 via a network connection 124 according to a network communication protocol. The network device 122 includes a network interface 126 that can be implemented as the representative network interface 112. The network device 122 also includes a cable tester 128 and an amplitude controller 130, examples of which are described with reference to the respective components included in network switch 102. In this example, both the network switch 102 and the network device 122 can exchange performance, signal, and/or reception quality information, and adjust output amplitudes of signals for communication accordingly. For example, the network interface 108 at network switch 102 can receive an indication of reception quality of the communications at the network device 122, and the amplitude controller 120 can then adjust the output amplitude of the signal that is indicative of the communications according to the reception quality at the network device 122. Signal and/or reception quality at a network device can be determined or based on how well data is received and without errors when the output amplitude and power consumption are reduced. An indication of reception quality at network device 122 can be determined, at least in part, based on a signal reception error rate at the connected device.

In another embodiment, the network switch 102 is connected to network devices in an office environment 132. The network switch 102 is connected to an IP phone 134 via an Ethernet connection 136, and the IP phone 134 is connected to a computer device 138 via an Ethernet connection 140. The computer device 138 is also connected to a printer device 142 via an Ethernet connection 144. In an example, the various network devices in the office environment 132 can be implemented as power over Ethernet devices that receive electrical power, along with data packets or frames, from another connected device.

The network device 122 can be representative of each of the various network devices in the office environment 132, and each device can include a network interface for network and/or Ethernet communications, as well as a cable tester and an amplitude controller. Ethernet connections that are shorter than the one-hundred meter standard are common, such as in the office environment 132, and each of various network devices can implement embodiments of reduced power transmission as described herein to conserve power.

Figure 2:
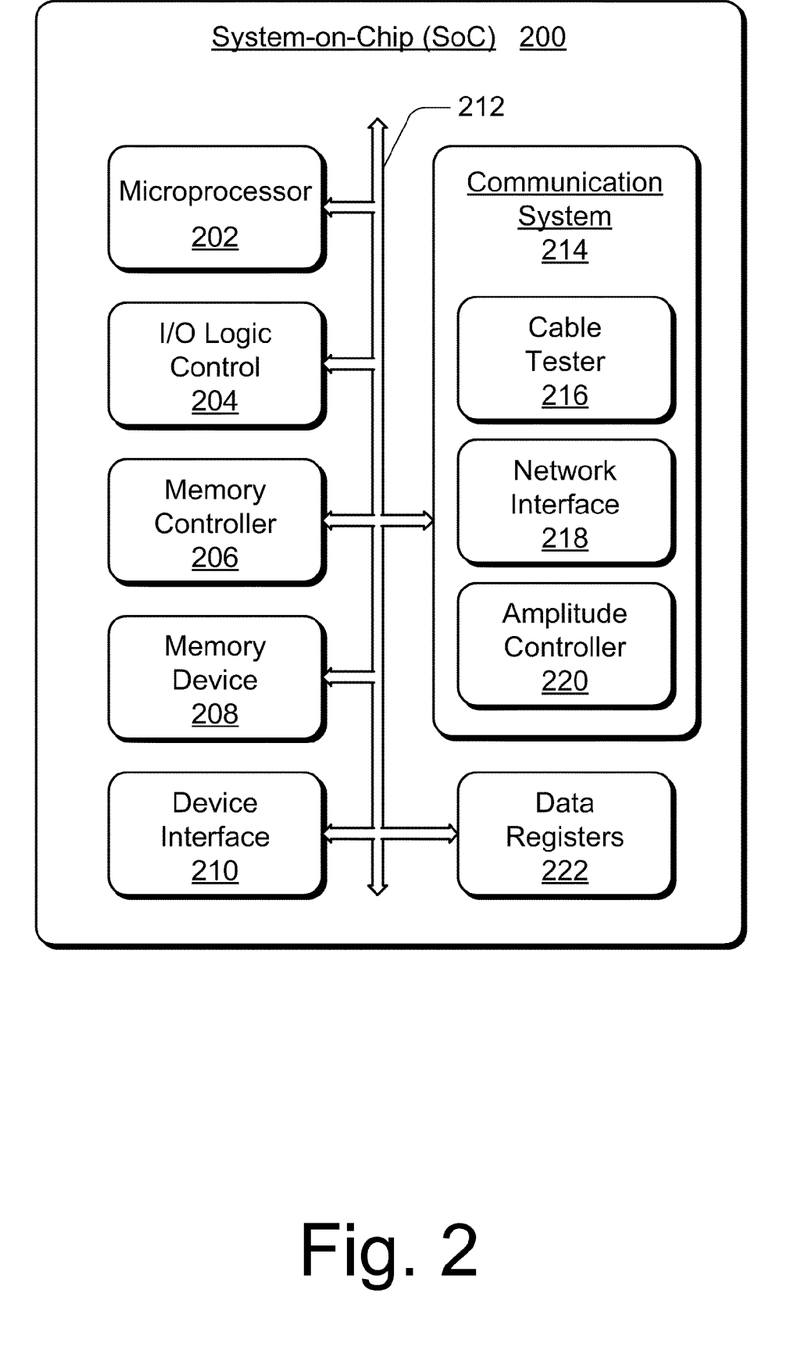
FIG. 2 illustrates an exemplary system-on-chip (SoC) environment in which embodiments of reduced power transmission can be implemented.

FIG. 2 illustrates an exemplary system-on-chip (SoC) 200 which can implement various embodiments of reduced power transmission in any type of an electronic and/or computing device. An SoC can be implemented in a fixed or mobile device, such as any one or combination of a communication device, media device, computer device, television set-top box, video processing and/or rendering device, appliance device, gaming device, electronic device, vehicle, workstation, and/or in any other type of device that may include Ethernet functionality.

The SoC 200 can be integrated with electronic circuitry, a microprocessor 202, input-output (I/O) logic control 204 (e.g., to include electronic circuitry, generally), communication interfaces and components, and other hardware, firmware, and/or software. In this example, the SoC 200 includes a memory controller 206 and a memory device 208 which can be any type of a nonvolatile memory, and/or other suitable electronic data storage. The SoC 200 also includes a device interface 210 to interface with a device or other peripheral component, such as when installed in any of the various switches and/or network devices described with reference to FIG. 1. In various embodiments, the SoC 200 can be implemented with any number and combination of the different components described with reference to the SoC 200. Alternatively, the SoC 200 may be implemented without any of the aforementioned components, and can be implemented with alternate components to implement embodiments of reduced power transmission in a network device.

The SoC 200 can also include an integrated data bus 212 that couples the various components of the SoC for data communication between the components. A data bus in the SoC can be implemented as any one or a combination of different bus structures, such as a memory bus or memory controller, an advanced system bus, a peripheral bus, a universal serial bus, and/or a processor or local bus that utilizes any of a variety of bus architectures. In addition, a device that includes SoC 200 can be implemented with any number and combination of differing components as further described with reference to the exemplary device shown in FIG. 4.

In various embodiments of reduced power transmission, the SoC 200 includes a communication system 214 that implements a cable tester 216, a network interface 218 for communications according to a network communication protocol, and an amplitude controller 220. Examples of the various components, functions, and/or modules, as well as corresponding functionality and features, are described with reference to the respective components of the exemplary network system 100 shown in FIG. 1. Alternatively or in addition, components of the communication system 214 can be implemented as hardware, firmware, fixed logic circuitry, or any combination thereof that is implemented in connection with the I/O logic control 204 and/or other processing and control circuits of SoC 200. In an embodiment, the SoC 200 also includes data registers 222 that maintain data corresponding to the characteristic, or characteristics, of a network connection, such as the signal-to-noise ratio (SNR) and/or gain status. The amplitude controller 220 can be implemented to read the data from the data registers 222 and adjust the output amplitude of the signal for the communications based on the data.

Exemplary method 300 is described with reference to FIG. 3 in accordance with one or more embodiments of reduced power transmission. Generally, any of the functions, methods, procedures, components, and modules described herein can be implemented using hardware (e.g., fixed logic circuitry), software, firmware, manual processing, or any combination thereof. A software implementation of a function, method, procedure, component, or module represents program code that performs specified tasks when executed on a computing-based processor. The exemplary methods may be described in the general context of computer-executable instructions, which can include software, applications, routines, programs, objects, components, data structures, procedures, modules, functions, and the like.

Figure 3:
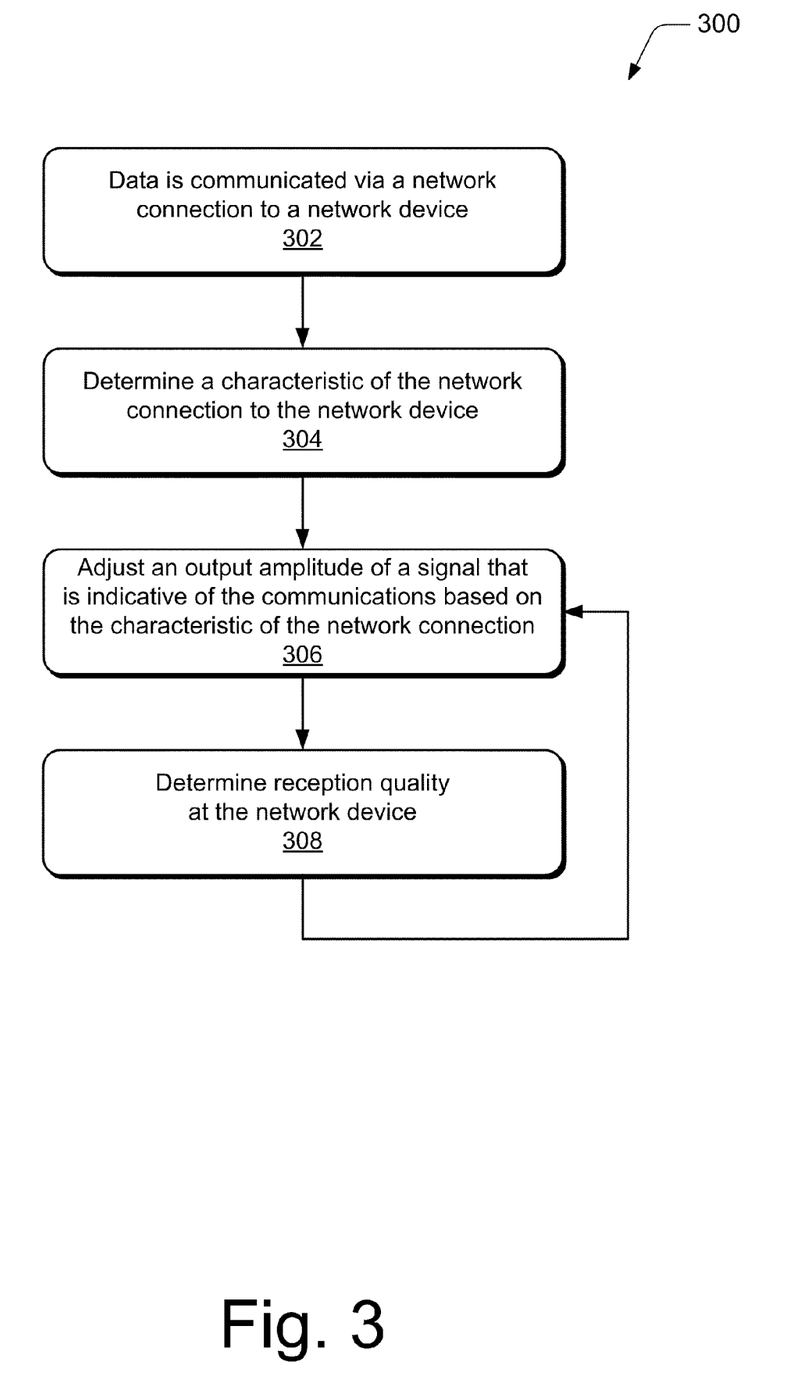
FIG. 3 illustrates exemplary method(s) of reduced power transmission in accordance with one or more embodiments.

FIG. 3 illustrates exemplary method(s) 300 of reduced power transmission. The order in which the method is described is not intended to be construed as a limitation, and any number of the described method blocks can be combined in any order to implement the method, or an alternate method.

At block 302, data is communicated via a network connection to a network device. For example, the network switch 102 is connected to the network device 122 via the network connection 124 according to a network communication protocol, and data packets or frames are communicated between the networked devices via the network connection. The physical layer of the network interface 108 at network switch 102 consumes power to transmit the data for communications.

At block 304, a characteristic of the network connection to the network device is determined. For example, the cable tester 118 at network switch 102 determines a characteristic of the network connection 124, such as a length, signal-to-noise ratio (SNR), and/or gain of the network connection. In an embodiment, the cable tester 118 determines that the length of an Ethernet connection is less than the standard one-hundred meters (e.g., equal to or less than a preset length such as eighty meters) for Ethernet connections.

At block 306, an output amplitude of a signal that is indicative of the communications is adjusted based on the characteristic of the network connection. For example, the amplitude controller 120 at network switch 102 initiates that the output amplitude of the signal that is indicative of the communications be adjusted or reduced, and power consumption at the physical layer of the network interface 108 is conserved. In an embodiment, current is reduced by a current controller of the physical layer 114, or voltage is reduced by a voltage controller at the physical layer 114.

At block 308, reception quality at the network device is determined. For example, both the network switch 102 and the network device 122 exchange performance, signal, and/or reception quality information. An indication of the reception quality can be determined at least in part based on a signal reception error rate at the network device 122. In various embodiments, reception quality can be determined from a cable length measurement, from a signal-to-noise ratio (SNR), and/or the gain of the network connection when received, collected, or obtained from the network device 122 (i.e., the link partner of network switch 102). The transmitting PHY device (i.e., the physical layer 114 of network interface 108 at the network switch 102) can receive or obtain the signal-to-noise ratio (SNR) data and/or the gain data from the receiving PHY device (i.e., the physical layer 114 of network interface 126 at the network device 122). A mechanism of information exchange can be implemented as an upper layer network management protocol, or as embedded messages with the physical layer signal.

The method can then continue at block 306 after the determination is made as to whether the reception quality at the connected network device is maintained at an acceptable reception quality. For example, the reception quality at network device 122 can be maintained based on an allowable error rate and, optionally, a set margin of operability. If the reception quality is acceptable at the network device, then the output amplitude of the signal for communications can be reduced again (e.g., adjusted) at block 306, and the method repeated. In an embodiment, this process of output amplitude adjustment to conserve power is dynamic and implemented after establishing a network connection and while communicating via the network connection. If the reception quality is not acceptable at the network device, then the output amplitude of the signal can be increased (e.g., adjusted) on the higher side at block 306 to gain back some signal reception quality as determined by whether the reception quality at the connected network device is at an acceptable reception quality.

Figure 4:
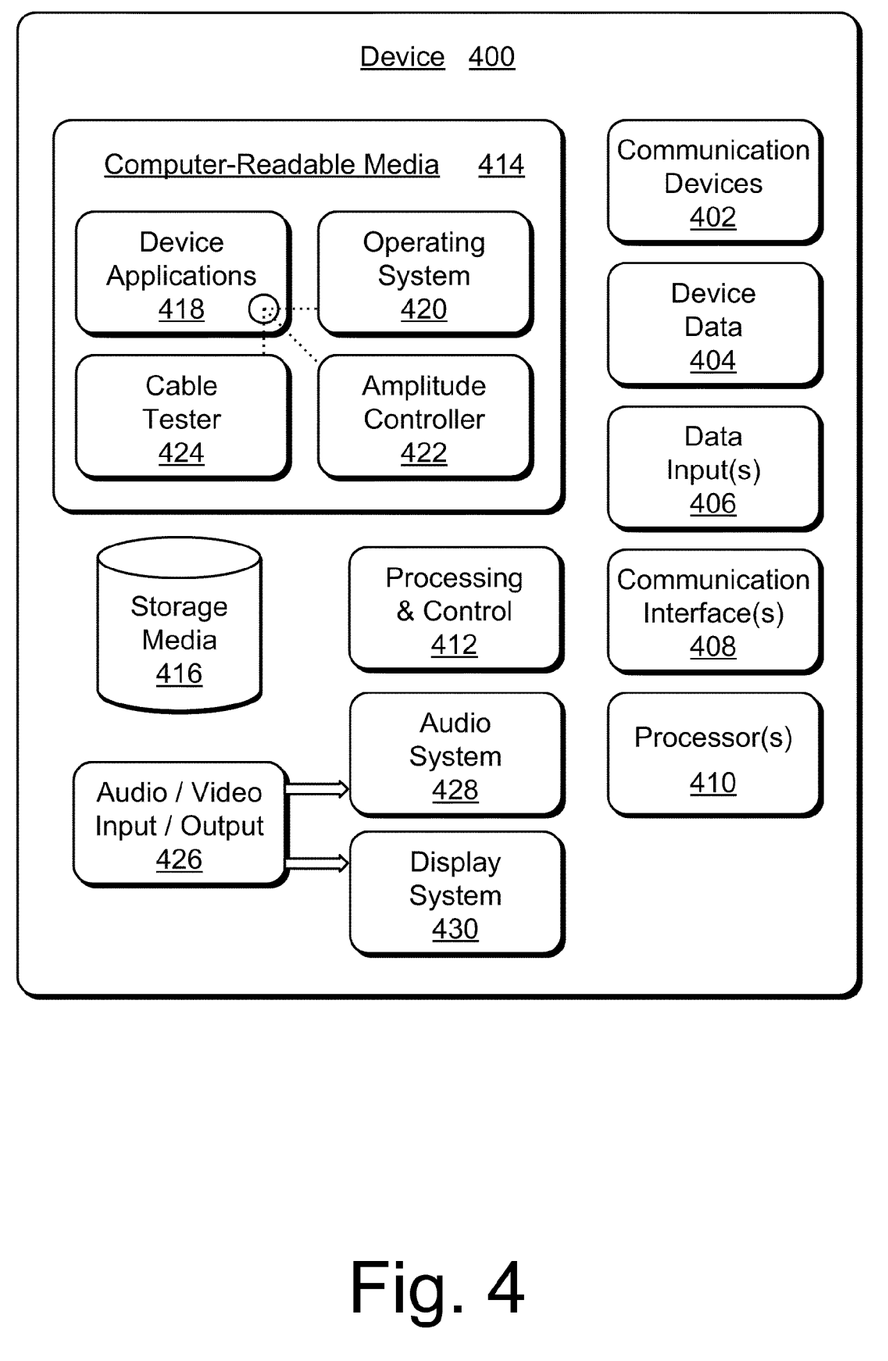
FIG. 4 illustrates various components of an exemplary device that can implement embodiments of reduced power transmission.

FIG. 4 illustrates various components of an exemplary device 400 that can be implemented as any type of device for Ethernet communication and/or implements various embodiments of reduced power transmission. For example, device 400 can be implemented to include the exemplary network interface 112, cable tester 118, and amplitude controller 120 as described with reference to FIG. 1 and/or can include the system-on-chip (SoC) 200 shown in FIG. 2. In embodiment(s), device 400 can be implemented as any one or combination of a wired and/or wireless device, network node device, client device, peer device, media device, computer device, communication device, television set-top box, video processing and/or rendering device, appliance device, gaming device, electronic device, vehicle, workstation, access point, and/or as any other type of device. Device 400 may also be associated with a user (i.e., a person) and/or an entity that operates the device such that a device describes logical devices that include users, software, firmware, and/or a combination of devices.

Device 400 includes communication devices 402 that enable communication of device data 404 (e.g., received data, data that is being received, data scheduled for broadcast, data packets of the data, etc.). The device data 404 or other device content can include configuration settings of the device and/or information associated with a user of the device. Device 400 also includes one or more data inputs 406 via which any type of data, media content, and/or inputs can be received, such as user-selectable inputs and any other type of audio, video, and/or image data.

Device 400 also includes communication interfaces 408 (e.g., a network interface card implemented for Ethernet communication) that can be implemented as any one or more of a serial and/or parallel interface, a wireless interface, any type of network interface, a modem, and as any other type of communication interface. The communication interfaces 408 provide a connection and/or communication links between device 400 and a communication network by which other electronic, computing, and communication devices can communicate data with device 400.

Device 400 includes one or more processors 410 (e.g., any of microprocessors, controllers, and the like) which process various computer-executable instructions to control the operation of device 400, to communicate with other electronic and computing devices, and to implement embodiments of reduced power transmission. Alternatively or in addition, device 400 can be implemented with any one or combination of hardware, firmware, or fixed logic circuitry that is implemented in connection with processing and control circuits which are generally identified at 412. Although not shown, device 400 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 400 also includes computer-readable media 414, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 400 can also include a mass storage media device 416.

Computer-readable media 414 provides data storage mechanisms to store the device data 404, as well as various device applications 418 and any other types of information and/or data related to operational aspects of device 400. For example, an operating system 420 can be maintained as a computer application with the computer-readable media 414 and executed on processors 410. The device applications 418 can include a device manager (e.g., a control application, software application, signal processing and control module, code that is native to a particular device, a hardware abstraction layer for a particular device, etc.). The device applications 418 can also include an amplitude controller 422 and a cable tester 424 (also referred to as a virtual cable tester) when device 400 implements various embodiments of reduced power transmission. In this example, the device applications 418 are shown as software modules and/or computer applications. Alternatively or in addition, the amplitude controller 422 and/or the cable tester 424 can each be implemented as hardware, software, firmware, or any combination thereof.

Device 400 can also include an audio and/or video input-output system 426 that provides audio data to an audio system 428 and/or provides video data to a display system 430. The audio system 428 and/or the display system 430 can include any devices that process, display, and/or otherwise render audio, video, and image data. Video signals and audio signals can be communicated from device 400 to an audio device and/or to a display device via an RF (radio frequency) link, S-video link, composite video link, component video link, DVI (digital video interface), analog audio connection, or other similar communication link. In an embodiment, audio system 428 and/or the display system 430 can be implemented as external components to device 400. Alternatively, the audio system 428 and/or the display system 430 can be implemented as integrated components of exemplary device 400.

Although embodiments of reduced power transmission have been described in language specific to features and/or methods, it is to be understood that the subject of the appended claims is not necessarily limited to the specific features or methods described. Moreover, the specific features and methods are disclosed as exemplary implementations of reduced power transmission.

The invention claimed is:

1. A network device, comprising:
    a network interface configured for communications with a connected device via an IEEE 802.3az connection;
    a cable tester configured to:
        determine a gain characteristic of the IEEE 802.3az connection from the network interface to the connected device;
        determine, based on the determined gain characteristic, a length of the IEEE 802.3az connection from the network interface to the connected device; and
    an amplitude controller configured to:
        adjust an output amplitude of a signal that is indicative of the communications based at least in part on the determined length of the IEEE 802.3az connection; and
        reduce the adjusted output amplitude of the signal if a reception quality at the connected device is maintained at an allowable reception quality, the reception quality based at least in part on a signal reception error rate at the connected device.

2. The network device as recited in claim 1, wherein the network interface is further configured for reduced power consumption based on the output amplitude of the signal that is adjusted for the communications.

3. The network device as recited in claim 1, wherein the amplitude controller is further configured to adjust the output amplitude of the signal based on one or more characteristics of the IEEE 802.3az connection after link establishment of the IEEE 802.3az connection.

4. The network device as recited in claim 1, wherein the amplitude controller is further configured to continue to reduce the adjusted output amplitude of the signal according to the reception quality at the connected device to maintain the allowable reception quality that correlates to a reduced output amplitude of the signal.

5. The network device as recited in claim 1, wherein the network interface includes a physical layer that consumes power to transmit the communications in accordance with a standard for the IEEE 802.3az connection, and wherein the amplitude controller is configured to reduce the output amplitude of the signal to reduce the power consumed by the physical layer of the network interface.

6. The network device as recited in claim 1, further comprising a system-on-chip (SoC) that integrates the network interface, the cable tester, and the amplitude controller.

7. The network device as recited in claim 6, wherein the SoC comprises one or more data registers that maintain data corresponding to the one or more characteristics of the IEEE 802.3az connection, and wherein the amplitude controller is further configured to read the data from the one or more data registers and adjust the output amplitude of the signal based on the data.

8. A network system, comprising:
an IEEE 802.3az connection configured for communications between networked devices;
a network device configured to:
  determine a gain characteristic of the IEEE 802.3az connection;
  determine, based on the determined gain characteristic, a length of the IEEE 802.3az connection from the network interface of the network device to a connected device;
  adjust an output amplitude of a signal that is indicative of the communications based at least in part on the determined length of the IEEE 802.3az connection; and
  reduce the adjusted output amplitude of the signal if a reception quality at the connected device is maintained at an allowable reception quality, the reception quality based at least in part on a signal reception error rate at the connected device.

9. The network system as recited in claim 8, wherein the network device is further configured to reduce power consumption when the output amplitude of the signal is reduced.

10. The network system as recited in claim 8, wherein the network device is further configured to continue to reduce the adjusted output amplitude of the signal if the reception quality at the connected device is maintained at the allowable reception quality.

11. A method implemented in a network device, the method comprising:
communicating with a connected device via a Green Ethernet connection;
determining a gain characteristic of the Green Ethernet connection;
adjusting an output amplitude of a communication signal based at least in part on the gain characteristic of the Green Ethernet connection; and
reducing the adjusted output amplitude of the communication signal, based at least in part on a length of the Green Ethernet connection, if a reception quality at the connected device is maintained at an allowable reception quality, the reception quality based at least in part on a signal reception error rate at the connected device.

12. The method as recited in claim 11, wherein the reducing comprises reducing the adjusted output amplitude of the communication signal for reduced power consumption that is utilized when communicating via the Green Ethernet connection.

13. The method as recited in claim 11, further comprising:
establishing the Green Ethernet connection with the connected device; and
wherein the reducing comprises reducing the output amplitude of the communication signal after establishing the Green Ethernet connection and communicating via the Green Ethernet connection.

14. The method as recited in claim 11, further comprising:
repeating said reducing of the adjusted output amplitude of the communication signal to maintain the allowable reception quality that correlates to a reduced output amplitude of the communication signal.

15. The method as recited in claim 11, further comprising:
consuming power to communicate with the connected device in accordance with a standard for the Green Ethernet connection;
determining that at least one of the one or more characteristics of the Green Ethernet connection is less than the standard; and
wherein the reducing of the adjusted output amplitude of the communication signal reduces the power that is being consumed.

* * * * *